No. 882,754. PATENTED MAR. 24, 1908.
O. G. HALEY.
CIDER PRESS.
APPLICATION FILED AUG. 3, 1907.
2 SHEETS—SHEET 1.
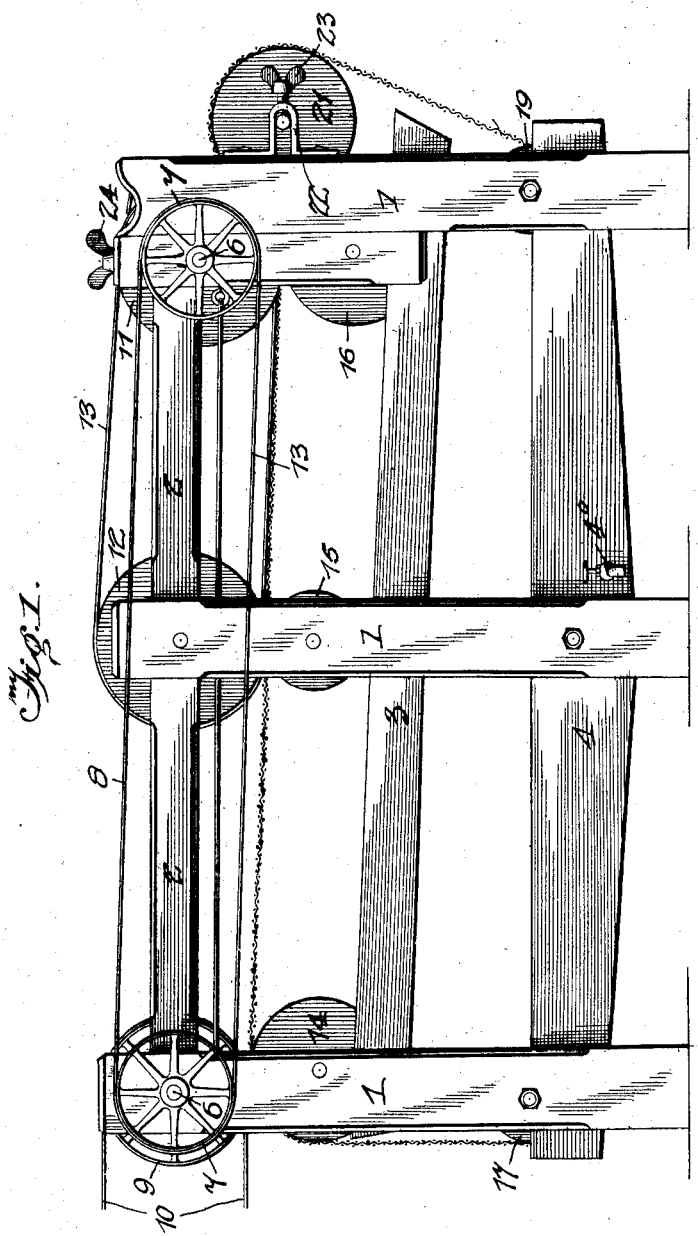
Witnesses:
Inventor:
Oscar G. Haley, No. 882,754. PATENTED MAR. 24, 1908.
O. G. HALEY.
CIDER PRESS.
APPLICATION FILED AUG. 3, 1907.
2 SHEETS—SHEET 2.
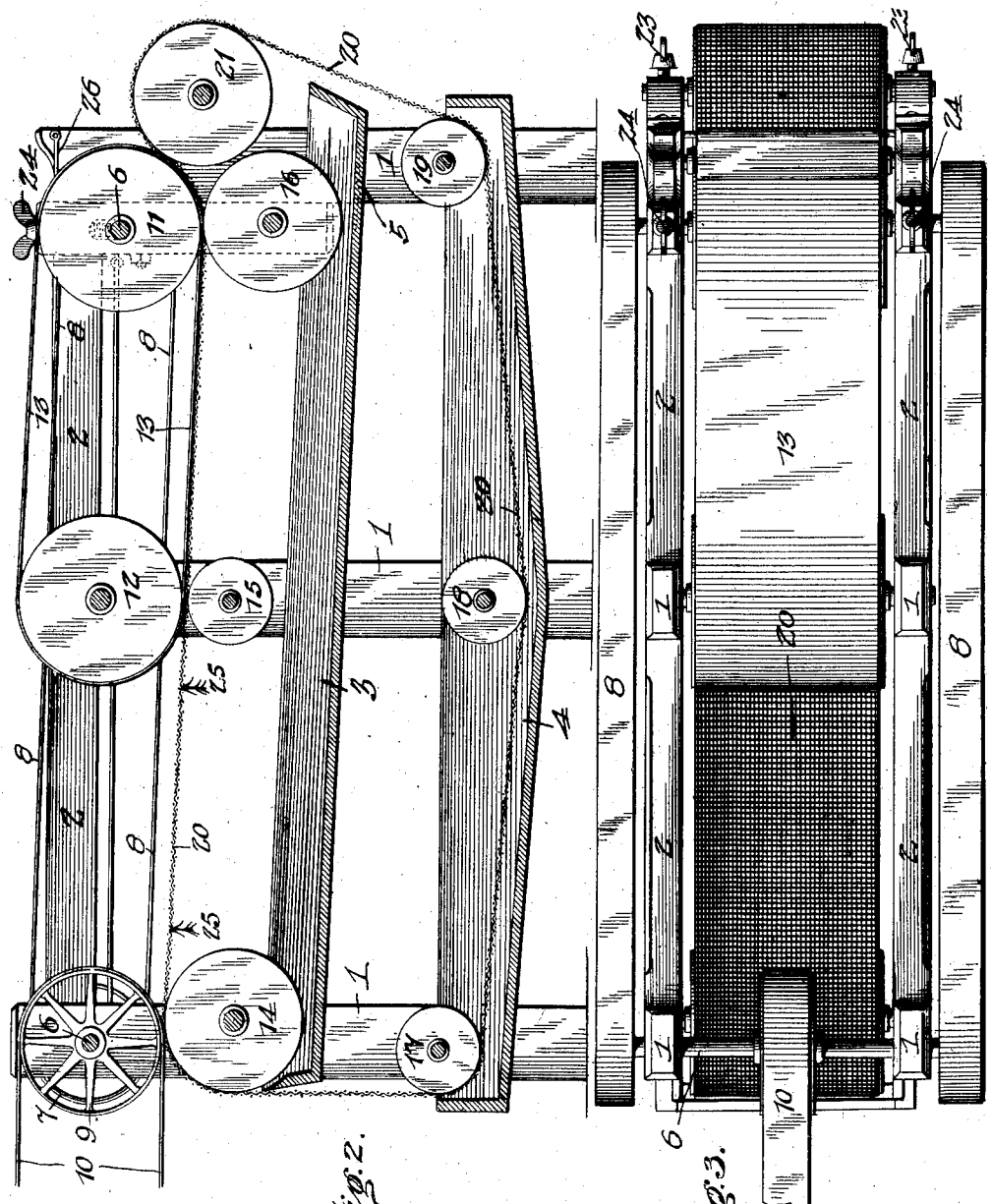

UNITED STATES PATENT OFFICE.

OSCAR G. HALEY, OF KENTS STORE, VIRGINIA.

CIDER-PRESS.

No. 882,754.  Specification of Letters Patent.  Patented March 24, 1908.

Application filed August 3, 1907. Serial No. 386,967.

*To all whom it may concern:*

Be it known that I, OSCAR G. HALEY, a citizen of the United States, residing at Kents Store, in the county of Fluvanna and State of Virginia, have invented certain new and useful Improvements in Cider-Presses, of which the following is a specification.

My invention relates broadly to cider presses and more particularly contemplates the provision of an improved structure of this character to facilitate the pressing of the fruit and to do away with the handling of the same as in ordinary presses.

My invention further and specifically resides in the following features of construction, arrangement and operation as will be hereinafter described with reference to the accompanying drawings forming a part of this specification, in which like numerals are used to designate like parts throughout the several figures, and in which Figure 1 is a side elevation of my improved structure, Fig. 2 is a vertical sectional view taken therethrough, and Fig. 3 is a top plan view thereof.

In the practical embodiment of my invention I provide a structure comprising uprights 1 alined in pairs and forming with their longitudinal horizontal beams 2 a substantially rectangular frame for the support of the pressing mechanism. Mounted within said frame and suitably attached to the uprights 1 are a pair of superposed side trays 3 and 4, the upper tray 3 being slightly inclined and provided adjacent its lower end with an outlet 5 to allow the liquid to drop within the lower tray 4, and the lower tray 4 being provided with an outlet cock 4°.

Through the end uprights 1 of the frame are mounted transverse shafts 6 carrying pulleys 7 upon their ends outside said frame for the reception of the driving belt 8. The shaft 6 at one end of the frame is provided with a central pulley 9 having a belt 10 arranged thereon and leading from a suitable source of power. The other shaft 6 is provided with a roller 11 connected to a driven and similar roller 12 mounted between the central uprights 1, by means of a cloth belt 13.
Rollers 14, 15, and 16 are mounted between the uprights 1, above the upper liquid tray 3, rollers 15 and 16 being located to press the fruit between themselves and the rollers 12 and 11 respectively. In like manner rollers 17, 18, and 19 are mounted between the uprights 1 within the lower tray 4 slightly above the base thereof in order to cause the gauze belt 20, traveling about the rollers 14, 15, 16, 17, 18 and 19, to pass through the liquid within the tray 4. A roller 21 has its shaft loosely supported in brackets 22 extending from one end of the frame, over which the gauze belt 20 is trained from the roller 16, and said roller 21 is made adjustable in order to tighten or loosen said gauze belt by means of adjusting screws 23. The roller 11 carrying, with the roller 12, the cloth belt 13 is also rendered adjustable in like manner by means of an adjusting screw 24, the rollers 21 and 11 being thereby capable of adjustment to tighten or loosen their respective belts 20 and 13, but may be relatively adjusted toward one another and toward the roller 16 for the better pressing of the pulp passing therebetween.

In operation the fruit is received upon the gauze belt 20 between the arrows 25 and passes from said belt between rollers 12 and 15 where it receives the first pressing and then on between rollers 11 and 16 and 11 and 21 where the liquid is thoroughly removed therefrom. The remaining pulp is designed to be carried by the gauze belt 20, and to be cleaned therefrom by suitable rotating brush on the right, while any of the pulp which may remain sticking upon the cloth belt B will be removed therefrom by a scraper 26.

Having thus described my invention, I claim:

In a cider press a supporting frame comprising uprights alined in pairs and provided with horizontal supporting beams therebetween, liquid trays superposed within said frame, the upper of said trays being slightly inclined and having a discharge opening at its lower end to discharge the liquid into said lower tray, rollers mounted between said vertical uprights above said upper and lower trays, a gauze belt arranged to travel about said rollers and through the liquid within said lower tray, a pair of rollers mounted above said upper tray rollers and carrying a cloth belt thereon, means for adjusting one of said rollers, means for driving said rollers, a roller adjustably mounted adjacent one of said last named rollers and one of said upp tray rollers, and having said gauze belt trained thereover, and means for adjusting said last named roller to and from its adjacent rollers, for a more thorough pressing of the material and for the purpose of tightening and loosening said gauze belt, substantially as described.

In testimony whereof I affix my signature in presence of two witnesses.

OSCAR G. HALEY.

Witnesses:
C. E. WATKINS,
ANDREW J. HALEY.